3,808,173
METHOD FOR CROSSLINKING A CHLORINE-CONTAINING POLYMER
Shiroji Orihashi, Tokyo, Japan, assignor to Nihon Hikaku Kabushiki Kaisha, Tokyo, Japan
No Drawing. Filed Dec. 20, 1971, Ser. No. 210,157
Claims priority, application Japan, Dec. 23, 1970, 45/115,709
Int. Cl. C08f 3/30, 15/40
U.S. Cl. 260—47 R                       17 Claims

ABSTRACT OF THE DISCLOSURE

A method for crosslinking a chlorine-containing polymer by bringing in contact a chlorine-containing polymer having carbon-chlorine bonds with a salt of polyvalent inorganic or organic acid in the presence of a salt of hydrocarbyl saturated onium, or alternatively by bringing the polymer in contact with a hydrocarbyl saturated onium salt of polyvalent inorganic or organic acid.

---

This invention relates to a method for crosslinking a chlorine-containing polymer by bringing a chlorine-containing polymer having carbon-chlorine bonds in contact with a salt of polyvalent inorganic or organic acid in the presence of a salt of hydrocarbyl saturated onium and more particularly, this invention relates to a method for crosslinking a chlorine-containing polymer having carbon-chlorine bonds by bringing the polymer in contact with a metal salt of polyvalent inorganic weak acid or a metal salt of polyvalent organic acid in the presence of a hydrocarbyl saturated onium salt in a catalytic amount, or alternatively by causing a chlorine-containing polymer to contact a hydrocarbyl saturated onium salt of a polyvalent inorganic weak acid or of a polyvalent organic acid.

The carbon-chlorine bonds in polymer and especially, the saturated carbon atom-chlorine atom bonds in polymer are chemically quite stable and therefore, no effective method for crosslinking linear polymers having carbon-chlorine bonds by the utilization of such bonds has been so far provided.

The present invention is based on the discovery that although the carbon-chlorine bonds in a polymer normally may not react directly with any salt of polyvalent inorganic and organic acid, such bonds in the polymer can react with the salt of polyvalent acids in the presence of a certain hydrocarbyl saturated onium salt thereby to crosslink the molecules of the chlorine - containing polymer.

Salts of polyvalent organic acids which can be employed in the present invention as crosslinking reagents include metal and organometal salts of aliphatic- or aromatic-polyvalent compounds having two or more functional groups selected from the group comprising carboxyl, mercapto and phenolic hydroxyl radicals.

It has been experimentally found that differences in the structures of these compounds would not substantially affect the crosslinking reaction speed and reaction rate in the crosslinking method of the present invention.

Specific examples of polyvalent organic acids useful in the preparation of these compounds are aliphatic or aromatic dicarboxylic acid compounds such as oxalic acid, malonic acid, succinic acid, glutaric acid, adipic acid, pimelic acid, suberic acid, azelaic acid, sebacic acid, maleic acid, fumaric acid, citraconic acid, mesaconic acid, itaconic acid, glutaconic acid, tartronic acid, malic acid, tartaric acid, citric acid, phthalic acid, isophthalic acid, terephthalic acid, and the like; dimercaptane compounds such as ethanedithiol, butanedithiol, dithioglycerol, dimercaptoacetone, dithiocatechol dithioresorcinol dithioquinol, and the like; dihydric phenol compounds such as hydroquinone, catechol, resorcinol, bisphenol-A and the like; and dibasic compounds such as thioglycolic acid and p-hydroxybenzoic acid and the like. In addition to the above-mentioned polyvalent organic acids, there are some polyvalent carboxylic acid compounds which can be obtained by the ether or ester linking of polyhydric alcohol such as glycerol or glycols with hydroxy-caboxylic acid or dicarboxylic acid, for example. Furthermore, in the method of the present invention, long chain-type polyvalent compounds such as polyoxypropylene diadipate, carboxyl ended polyester and Thiokol resin, a registered trademark by Thiokol Chemical Corp. for polymers produced by chemical reaction between dichlorodiethylformal and an alkali polysulfide, can be also employed. When the long chain-type polyvalent compounds are employed, the polymer is crosslinked and is internally plasticized at the same time. In carrying out the crosslinking method of the present invention, although the objects of the invention can generally be attained by the use of dibasic compounds, higher polyvalent compounds such as glycerol tri-succinate, polyacrylic acid and co-polymer thereof can be also selectively employed.

Polyvalent inorganic salts which can be employed as the crosslinking reagents in the invention include metal- and organometal salts of inorganic weak acids capable of forming salts with divalent or higher polyvalent bases, or two or more monovalent or polyvalent bases. Polyvalent inorganic weak acids suitably employed in the preparation of polyvalent inorganic salts of the invention include carbonic acid, hydrogen sulfide, boric acid and silicic acid. It has been experimentally found that differences in these inorganic weak acids would not substantially affect the crosslinking reaction speed and reaction rate in the crosslinking method of the present invention.

Although alkaline metal salts such as sodium, potassium and lithium salts are advantageously employed, other metal salts, such as calcium, magnesium, barium, beryllium, zinc, copper, cadmium and strontium salts, can be also employed for carrying out the crosslinking reaction according to the invention. Therefore, the use of such other metal salts is also within the scope of the invention. Furthermore, the above-mentioned polyvalent acids may be employed in the form of organometal salts. Especially, any of the organotin sulfides and organotin carboxylates such as dimethyltin sulfide, bis-trimethyltin sulfide dibutyltin sulfide, bistributyltin sulfide, dioctyltin sulfide, dibutyltin maleate, dioctyltin maleate and the like can be employed as the crosslinking reagent and in such a case, the reagent has excellent solubility in the organic medium employed (solvent, plasticizer and polymer) and acts as a stabilizer.

According to the present invention, metal and organometal salts of the above-mentioned polyvalent inorganic or organic acids can be selectively employed as the crosslinking agent. It has been experimentally found that the type of metals and organometals to be employed would not substantially affect the crosslinking reaction speed and reaction rate in the crosslinking method of the present invention.

The hydrocarbyl saturated onium salts to be employed as the catalysts in the crosslinking reaction method of the invention are salts of certain acids and oniums which are saturated with hydrocarbyl radicals. The hydrocarbyl radicals are identical or may be different radicals selected from the group consisting of alkyl-, alkenyl-, cycloalkyl-, aryl- and aralkyl radicals. Alkyl or alkenyl radicals suitably employed in the invention include methyl, ethyl, propyl, isopropyl, butyl, pentyl, hexyl, lauryl, stearyl, vinyl, allyl, oleyl and the like. The cycloalkyl radicals are cyclopentyl, cyclohexyl and the like. The aryl radicals are phenyl and alkylphenyls, naphthyl, alkylnaphthyls and the like. The aralkyl radicals are benzyl, phenethyl, alkylbenzyl and the like.

Similarly, heterocyclic onium salts being alkyl saturated onium salts in which two of the alkyl radicals are cyclized, such as alkyl pyridinium salts, N,N-dialkyl morpholinium salts, N,N-dialkyl pyrrolidinium salts, N,N-dialkyl pyperazinium salts and the like also can be employed. The hydrocarbyl radicals of the hydrocarbyl saturated onium salts of the invention may be hydroxyl radical-, alkoxyl radical-, halogen radical-, ester radical-, amino radical-, amido radical and nitro radical substituted hydrocarbyl radicals.

Differences in the structures of these hydrocarbyl radicals would not substantially affect the crosslinking reaction rate and reaction ratio in the crosslinking method of the invention.

The hydrocarbyl saturated onium salts of the present invention are formed from hydrocarbyl saturated ammonium-, phosphonium-, sulfonium-, selenonium-, arsonium-, stibonium-, and telluronium cations, but preferably from hydrocarbyl saturated ammonium-, phosphonium-, sulfonium- and selenonium cations because they are less expensive and less toxic. Differences in the types of the central atoms of onium cation would not substantially affect the reaction speed and reaction rate in the crosslinking reaction method of the invention.

According to the present invention, acids that are capable of forming salts which are to be used as a catalyst, with the hydrocarbyl saturated oniums are conventional inorganic and organic acids, such as hydrochloric acid, hydrobromic acid, hydroiodic acid, sulfuric acid, sulfurous acid, alkyl sulfuric acid, phosphoric acid, nitric acid, nitrous acid, carboxylic acid such as acetic acid and stearic acid; mercaptans; and other compounds having phenolic hydroxyl radicals.

Furthermore, the polyvalent inorganic or organic acids, which are mentioned above as the crosslinking reagent components, can be used as a component for forming the catalyst. The amount of alkyl saturated onium salt to be employed as the catalyst in the crosslinking method of the invention is not limited within any specific range. However, it is proven that the greater the amount of catalyst used, the higher the crosslinking reaction speed, and therefore, those skilled in that art can readily determine the proper catalyst amount depending upon the specific molding process conditions for chlorine-containing polymers employed and applications of moldings formed of the crosslinked polymers. Generally, it is preferred that the amount of the catalyst be within the range of 1–0.01% by weight based on the weight of polymer employed, but even with catalyst in amounts over or below the specified range it is possible to carry out the crosslinking reaction method of the invention.

In this invention, a chlorine-containing polymer is conveniently crosslinked with the metal salt of polyvalent inorganic or organic acid as crosslinking reagent and the hydrocarbyl saturated onium salt as catalyst. Alternatively, a chlorine, containing polymer is crosslinked with the salt of hydrocarbyl saturated onium mentioned above and the polyvalent inorganic weak acid or organic acid mentioned above. In this case, another hydrocarbyl saturated onium salt is unnecessary as catalyst and the crosslinking reaction rate is very high.

Polymers which can be suitably crosslinked by the method of the invention are polymers having carbon-chlorine bonds. Although the invention is especially applicable to the crosslinking of polymers having chlorine atoms bonded to saturated carbon atoms such as polyvinyl chloride or copolymers thereof, chlorinated polyethylene, chlorinated polyvinyl chloride and polyvinylidene chloride, the invention is also applicable to polymers having chlorine atoms bonded to unsaturated carbon atoms without departing from the scope of the invention.

Although the mechanism of the crosslinking reaction may be subject to speculation, it is considered that the crosslinking reaction of the invention progresses through the following mechanism:

(a) In the case in which a chlorine-containing polymer having carbon-chlorine bonds is brought in contact with a hydrocarbyl saturated onium salt of a polyvalent organic or inorganic weak acid, the crosslinking reaction will be expressed as follows:

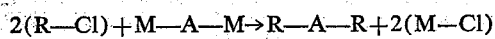

wherein R is a polymer residue, M is a hydrocarbyl saturated onium group and A is a polyvalent organic or inorganic weak acid residue.

In this case, the chlorine atoms of the chlorine-containing polymer are replaced by a polyvalent organic or inorganic weak acid residue of a hydrocarbyl saturated onium salt of a polyvalent organic or inorganic weak acid, resulting in an ester crosslinkage between the polymer molecules, with hydrocarbyl saturated onium chlorides as the by-product.

(b) In the case in which a chlorine-containing polymer having carbon-chlorine bonds is brought in contact with a metal or organometal salt of a polyvalent organic or inorganic weak acid in the presence of a hydrocarbyl saturated onium salt as the catalyst, the crosslinking reaction will be expressed as follows:

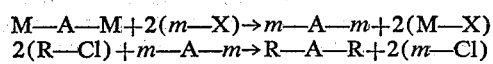

wherein $m$ is a metal atom or organometal radical, and X is an acid residue. R, M and A are the same as defined in the above (a).

In this case, metal atoms or organometal radicals of a metal or organometal salt of a polyvalent organic or inorganic weak acid are replaced by hydrocarbyl saturated onium groups of hydrocarbyl saturated onium salts as catalysts. Next, a hydrocarbyl saturated onium salt of a polyvalent organic or inorganic weak acid reacts with a chlorine-containing polymer in the same manner as above (a), and hydrocarbyl saturated onium chlorides are reproduced as catalysts.

The crosslinking reaction of the invention can be performed in the presence of any of the solvents and plasticizers conventionally employed in the plastics industry. On the other hand, the crosslinking reaction of the invention can be performed without the use of any of the solvents and plasticizers because the polymer to be crosslinked itself serves as the reaction medium.

Temperature conditions to be employed in performing the crosslinking reaction according to the invention are not limited within any specific range and can be optionally selected depending upon the applications of the crosslinked polymer. The crosslinking reaction progresses slowly at room temperature for a period of about one month or more and accelerates as the temperature increases. However, the temperature at which the crosslinking reaction is carried out may usually be in such range that the polymer to be crosslinked has a suitable workability, and the preferred range of 60° to 170° C., by way of example, may be used. Therefore, the crosslinking reaction of the invention can be performed during any of the conventional molding processes such as the casting-, plastisol-, calender-, extruding-, injection- and pressing-process or can be performed under suitably selected temperature conditions after the molding process. Furthermore, the crosslinking reaction can be also performed at room temperature for a prolonged period after the molding process.

The invention will be now described by way of specific examples. In each of the following examples, the gel fraction and the swelling ratio are calculated by the following formulas, respectively.

$$\text{Gel fraction} = \frac{z}{x+z} \times 100 \text{ (percent)}$$

$$\text{Swelling ratio} = \frac{y}{z}$$

wherein $z$ is the dry weight of the crosslinked polymer portion which is swollen and cannot be dissolved in hot cyclohexanone, $x$ is the dry weight of the uncrosslinked polymer portion which is dissolved in hot cyclohexanone, and $y$ is the weight of the swollen gel of crosslinked polymer in cyclohexanone.

EXAMPLE 1

100 parts of polyvinyl chloride, 10 parts of sodium carbonate, 0.5 part of tetramethylammonium chloride and 3 parts of stabilizer were mixed together by hot rolls at 150° C. for 10 minutes. The mixture was then molded under pressure in a hot press at 160° C. for 30 minutes to obtain a light yellow crosslinked polyvinyl chloride sheet 0.5 mm. thick.

The gel fraction and swelling ratio of the sheet were 100% and 3.4, respectively.

EXAMPLE 2

100 parts of polyvinyl chloride, 10 parts of sodium carbonate, 0.5 part of tetraethylammonium nitrate and 3 parts of stabilizer were mixed together by hot rolls at 150° C. for 10 minutes and the mixture was then molded under pressure in a hot press at 160° C. for 30 minutes to obtain a light yellow crosslinked polyvinyl chloride sheet 0.5 mm. thick.

The gel fraction and swelling ratio of the sheet were 100% and 4.5, respectively.

EXAMPLE 3

100 parts of polyvinyl chloride, 50 parts of dioctyl phthalate as the plasticizer, 10 parts of potassium carbonate, 1 part of N-butylpyridinium phenolate and 3 parts of stabilizer were mixed together by hot rolls at 150° C. for 10 minutes and the mixture was then molded under pressure in a hot press at 160° C. for 1 hour to obtain a crosslinked polyvinyl chloride sheet 1 mm. thick.

The gel fraction and swelling ratio of the sheet were 100% and 7.3, respectively.

EXAMPLE 4

100 parts of polyvinyl chloride, 30 parts of tricresyl phosphate as the plasticizer, 5 parts of lithium carbonate, 1 part of trimethylanilinium acetate and 2 parts of stabilized were mixed together by hot rolls at 150° C. for 10 minutes and the mixture was then molded under pressure in a hot press at 170° C. for 30 minutes to obtain a light yellow crosslinked polyvinyl chloride sheet 1 mm. thick.

The gel fraction and swelling ratio of the sheet were 100% and 12.0 respectively.

EXAMPLE 5

100 parts of vinyl chloride-vinyl acetate-ethylene copolymer, 10 parts of dibutyltin sulfide and 1 part of butyltriphenylphosphonium bromide were dissolved in 800 parts of dimethylformamide and the mixture solution was dried over a tray under reduced pressure to remove the solvent thereby to provide a film 0.3 mm. thick. The film was heated at 140° C. for 2 hours to obtain a crosslinked polyvinyl chloride copolymer film. The gel fraction and swelling ratio of the film were 100% and 8.6, respectively.

EXAMPLE 6

100 parts of chlorinated polyethylene (41% chlorine), 10 parts of dimethyltin sulfide and 0.5 part of trimethylselenonium iodide were mixed together by hot rolls at 150° C. for 10 minutes and the mixture was then molded under pressure in a hot press at 160° C. for 1 hour to obtain a colorless crosslinked chlorinated polyethylene sheet 0.5 mm. thick.

The gel fraction and swelling ratio of the sheet were 100% and 13, respectively.

EXAMPLE 7

100 parts of chlorinated polyvinyl chloride (62% chlorine), 10 parts of dioctyltin sulfide and 0.5 part of triethylsulfonium chloride were mixed together by hot rolls at 150° C. for 10 minutes and the mixture was then molded under pressure in a hot press at 160° C. for 1 hour to obtain a light yellow crosslinked chlorinated polyvinyl chloride sheet 0.5 mm. thick.

The gel fraction and swelling ratio of the sheet were 100% and 9.3, respectively.

EXAMPLE 8

100 parts of polyvinylidene chloride, 10 parts of bistribtuyltin sulfide and 0.3 part of tetrabutylammonium chloride were dissolved in 800 parts of dimethylformamide and the mixture solution was dried over a tray under reduced pressure to remove the solvent thereby to obtain a film 0.3 mm. thick. The film was heated at 80° C. for 3 hours to obtain a colorless crosslinked polyvinylidene chloride film.

The gel fraction and swelling ratio of the sheet were 100% and 10.2, respectively.

EXAMPLE 9

100 parts of neoprene, 20 parts of sodium carbonate and 0.5 part of lauryltrimethylammonium sulfate were mixed together by hot rolls at 60° C. for 15 minutes and the mixture was then molded under pressure in a hot press at 160° C. for 30 minutes to obtain a crosslinked neoprene sheet 1 mm. thick.

The gel fraction and swelling ratio of the sheet were 97% and 15, respectively.

EXAMPLE 10

100 parts of polyvinyl chloride, 5 parts of tributyltin terephthalate and 0.2 part of tetrabutylammonium nitrate were dissolved in 800 parts of dimethylformamide and the mixture solution was then dried over a tray under reduced pressure to remove the solvent thereby to obtain a film 0.3 mm. thick and the film was then heated at 140° C. under reduced pressure for 1 hour to obtain a colorless crosslinked polyvinyl chloride film.

The gel fraction and swelling ratio of the sheet were 100% and 8.0, respectively.

EXAMPLE 11

100 parts of polyvinyl chloride, 5 parts of potassium salt of bisphenol-A, 0.2 part of tetraethylammonium salt of butylmercaptane, 30 parts of tricresyl phosphate as the plasticizer and 3 parts of stabilizer were mixed together by hot rolls at 120° C. for 10 minutes and the mixture was then molded under pressure in a hot press at 150° C. for 1 hour to obtain a light yellow crosslinked polyvinyl chloride sheet 1 mm. thick.

The gel fraction and swelling ratio of the sheet were 100% and 8.6, respectively.

EXAMPLE 12

100 parts of polyvinyl chloride, 7 parts of lithium salt of polyoxypropylene (average molecular weight of 400) disuccinate, 0.3 part of trimethylanilinium acetate, 30 parts of dioctyl phthalate as the plasticizer and 5 parts of stabilizer were mixed together by hot rolls at 120° C. and the mixture was then molded by hot rolls at 160° C. to obtain a film 0.3 mm. thick. The film was maintained in a hot chamber at 140° C. for 2 hours to obtain a light yellow crosslinked polyvinyl chloride film.

The gel fraction and swelling ratio of the film were 100% and 9.2, respectively.

EXAMPLE 13

100 parts of polyvinyl chloride, 5 parts of calcium adipate, 0.2 part of triethylsulfonium chloride, 30 parts of tricresyl phosphate as the plasticizer and 2 parts of stabilizer were mixed together by hot rolls at 120° C. for 10 minutes and the mixture was then molded under pressure in a hot press at 160° C. for 30 minutes to obtain a crosslinked polyvinyl chloride sheet 1 mm. thick. The gel fraction and swelling ratio of the sheet were 100% and 9.7, respectively.

EXAMPLE 14

100 parts of polyvinyl chloride, 5 parts of magnesium salt of ethylene mercaptane, 0.5 part of butyltriphenylphosphonium bromide, 35 parts of dioctyl phthalate as the plasticizer and 5 parts of the stabilizer were mixed together by hot rolls at 120° C. for 10 minutes and the mixture was then molded under pressure in a hot press at 160° C. for 45 minutes to obtain a light yellow crosslinked polyvinyl chloride sheet 1 mm. thick. The gel fraction and swelling ratio of the sheet were 100% and 9.2, respectively.

EXAMPLE 15

100 parts of polyvinyl chloride, 5 parts of a compound in which both the carboxyl- and thiol radicals in thioglycolic acid are in the form of zinc salts, 0.2 part of tetramethylammonium chloride and 1.5 parts of the stabilizer were dissolved in 1000 parts of dimethylformamide and the mixture solution was dried over a tray under reduced pressure to remove the solvent thereby to obtain a film 0.3 mm. thick. The film was heated at 140° C. for 2 hours to obtain a colorless crosslinked polyvinyl chloride film. The gel fraction and swelling ratio of the film were 100% and 9.4, respectively.

EXAMPLE 16

100 parts of chlorinated polyethylene (41% chlorine), 10 parts of dibutyltin salt of Thiokol, earlier defined herein, resin (average molecular weight of 1000), 0.2 part of trimethylselenonium iodide and 2 parts of the stabilizer were mixed together by hot rolls at 120° C. for 10 minutes and the mixture was then molded under pressure in a hot press at 160° C. for 1 hour to obtain a light yellow crosslinked chlorinated polyethylene sheet 1 mm. thick. The gel fraction and swelling ratio of the sheet were 100% and 11.5, respectively.

EXAMPLE 17

100 parts of chlorinated polyvinyl chloride (62% chlorine), 5 parts of a compound in the form of potassium salts of the carboxyl- and hydroxyl radicals in p-hydroxybenzoic acid, 0.1 part of N-butylpyridinium carbonate, 15 parts of tricresyl phosphate as the plasticizer, and 5 parts of the stabilizer were mixed together by hot rolls at 120° C. for 10 minutes and the mixture was then molded under pressure in a hot press at 160° C. for 45 minutes to obtain a light yellow crosslinked chlorinated polyvinyl chloride sheet 1 mm. thick. The gel fraction and swelling ratio of the sheet were 100% and 11.2, respectively.

EXAMPLE 18

100 parts of neoprene, 5 parts of sodium salt of hydroquinone and 0.3 part of laurayltrimethylammonium sulfide were mixed together by hot rolls at 60° C. for 15 minutes and the mixture was then molded under pressure in a hot press at 160°C. for 1 hour to obtain a yellow yellow crosslinked neoprene sheet 1 mm. thick. The gel fraction and swelling rate of the sheet were 95% and 16.2, respectively.

EXAMPLE 19

100 parts of polyvinyl chloride and 5 parts of tetrabutylammonium salt of adipic acid were dissolved in 800 parts of dimethylformamide and the mixture solution was dried over a tray under reduced pressure to remove the solvent thereby to obtain a film 0.3 mm. thick. The film was heated at 80° C. for 1 hour to obtain a colorless transparent crosslinked polyvinyl chloride. The gel fraction and swelling ratio of the film were 100% and 7.5, respectively.

EXAMPLE 20

100 parts of polyvinyl chloride, 5 parts of trimethylanilinium salt of bisphenol-A, 50 parts of dioctyl phthalate as the plasticizer and 5 parts of the stabilizer were mixed together by hot rolls at 120° C. for 10 minutes and the mixture was molded under pressure in a hot press at 160° C. for 30 minutes to obtain a light yellow crosslinked polyvinyl chloride sheet 1 mm. thick. The gel fraction and swelling ratio of the sheet were 100% and 9.0, respectively.

EXAMPLE 21

100 parts of polyvinyl chloride, 7 parts of lauryltrimethylammonium salt of polyoxypropylene (average molecular weight of 400) disuccinate, 30 parts of dioctyl phthalate as the plasticizer and 5 parts of the stabilizer were mixed together by hot rolls at 120° C. for 10 minutes and the mixture was molded under pressure in a hot press at 150° C. for 1 hour to obtain a scarcely noticeable light yellow crosslinked polyvinyl chloride sheet 1 mm. thick. The gel fraction and swelling ratio of the sheet were 100% and 9.2, respectively.

EXAMPLE 22

100 parts of polyvinyl chloride, 5 parts of butyltriphenylphosphonium terephthalate, 30 parts of tricresyl phosphate as a plasticizer and 5 parts of the stabilizer were mixed together by hot rolls at 130° C. for 5 minutes and the mixture was molded under pressure in a hot press at 140° C. for 1.5 hours to obtain a scarcely noticeable light yellow crosslinked polyvinyl chloride sheet 1 mm. thick. The gel fraction and swelling ratio of the sheet were 100% and 9.5, respectively.

EXAMPLE 23

100 parts of polyvinyl chloride, 5 parts of triethylsulfonium salt of ethylene mercaptane, 30 parts of dioctyl phthalate as a plasticizer and 5 parts of the stabilizer were mixed together by hot rolls at 120° C. for 5 minutes and the mixture was molded by hot rolls at 160° C. to obtain a film 0.3 mm. thick.

The thus obtained film was maintained in a hot chamber at 100° C. for 4 hours to obtain a scarcely noticeable light yellow crosslinked polyvinyl chloride film. The gel fraction and swelling ratio of the film were 100% and 8.9, respectively.

EXAMPLE 24

100 parts of polyvinylidene chloride and 5 parts of trimethylselenonium salts of the carboxyl- and thiol radicals of thioglycolic acid were dissolved in 800 parts of dimethylformamide and the mixture solution was dried over a tray under reduced pressure to remove the solvent thereby to obtain a film 0.3 mm. thick. The film was heated at 100° C. for 1 hour to obtain a colorless crosslinked polyvinylidene chloride film. The gel fraction and swelling ratio of the film were 100% and 8.7, respectively.

EXAMPLE 25

100 parts of chlorinated polyethylene (41% chlorine), 10 parts of tetramethylammonium salt of Thiokol resin (average molecular weight of 1000) and 2 parts of the stabilizer were mixed together by hot rolls at 120° C. for 10 minutes. The mixture was then molded under pressure in a hot press at 150° C. for 1 hour to obtain a light yellow crosslinked chlorinated polyethylene sheet 1 mm. thick. The gel fraction and swelling ratio of the sheet were 100% and 10.3, respectively.

EXAMPLE 26

100 parts of chlorinated polyvinyl chloride (62% chlorine), 5 parts of tetraethylammonium salt of the carboxy- and hydroxyl radicals of p-hydroxy benzoic acid, 15 parts of tricresyl phosphate as the plasticizer and 5 parts of the stabilizer were mixed together by hot rolls at 120° C. for 10 minutes and the mixture was then molded under pressure in a hot press at 170° C. for 20 minutes to obtain a light yellow crosslinked chlorinated polyvinyl chloride sheet 1 mm. thick. The gel fraction and swelling ratio of the sheet were 100% and 9.8, respectively.

EXAMPLE 27

100 parts of neoprene and 5 parts of N-butylpyridinium salt of hydroquinone were mixed together by hot rolls at 60° C. for 15 minutes and the mixture was then molded under pressure in a hot press at 150° C. for 1 hour to obtain a light yellow crosslinked neoprene sheet 1 mm. thick. The gel fraction and swelling ratio of the sheet were 98% and 14.5, respectively.

EXAMPLE 28

100 parts of polyvinyl chloride, 10 parts of zinc sulfide, 0.5 part of tetrabutylammonium chloride and 3 parts of the stabilizer were mixed together by hot rolls at 150° C. for 10 minutes and the mixture was then molded under pressure in a hot press at 160° C. for 1 hour to obtain a reddish yellow crosslinked polyvinyl chloride sheet 0.5 mm. thick.

The gel fraction and swelling ratio of the sheet were 100% and 18.2 respectively.

EXAMPLE 29

100 parts of polyvinyl chloride, 10 parts of sodium metasilicate, 1 part of lauryltrimethylammonium chloride and 3 parts of the stabilizer were mixed together by hot rolls at 150° C. for 10 minutes and the mixture was then molded under pressure in a hot press at 160° C. for 1 hour to obtain a crosslinked polyvinyl chloride sheet 1 mm. thick.

The gel fraction and swelling ratio of the sheet were 100% and 15.0, respectively.

EXAMPLE 30

100 parts of polyvinyl chloride, 10 parts of sodium tetraborate, 1 part of tetrabutylammonium chloride and 2 parts of the stabilizer were mixed together by hot rolls at 150° C. for 10 minutes and the mixture was then molded under pressure in a hot press at 170° C. for 30 minutes to obtain a light yellow crosslinked polyvinyl chloride sheet 1 mm. thick. The gel fraction and swelling ratio of the sheet were 100% and 11.5, respectively.

EXAMPLE 31

100 parts of polyvinyl chloride and 5 parts of tetrabutylammonium sulfide were dissolved in 800 parts of dimethylformamide and the mixture solution was dried over a tray under reduced pressure to remove the solvent thereby to obtain a film 0.3 mm. thick. The film was heated at 100° C. for 1 hour to obtain a colorless crosslinked polyvinyl chloride film. The gel fraction and swelling ratio of the film were 100% and 8.8, respectively.

EXAMPLE 32

100 parts of polyvinyl chloride, 5 parts of tetrabutylammonium silicate and 2 parts of the stabilizer were mixed together by hot rolls at 120° C. for 10 minutes. The mixture was then molded under pressure in a hot press at 150° C. for 1 hour to obtain a light yellow crosslinked polyvinyl chloride sheet 1 mm. thick. The gel fraction and swelling ratio of the sheet were 100% and 9.8, respectively.

EXAMPLE 33

100 parts of polyvinyl chloride, 5 parts of tetraethylammonium carbonate and 5 parts of the stabilizer were mixed together by hot rolls at 120° C. for 10 minutes and the mixture was then molded under pressure in a hot press at 170° C. for 15 minutes to obtain a light yellow crosslinked polyvinyl chloride sheet 1 mm. thick. The gel fraction and swelling ratio of the sheet were 100% and 8.7, respectively.

EXAMPLE 34

100 parts of polyvinyl chloride, 10 parts of tetrabutylammonium borate, and 3 parts of the stabilizer were mixed together by hot rolls at 130° C. for 15 minutes and the mixture was then molded under pressure in a hot press at 150° C. for 1 hour to obtain a light yellow crosslinked polyvinyl chloride sheet 1 mm. thick. The gel fraction and swelling ratio of the sheet were 100% and 10.5, respectively.

While there have been described what are at present considered to be the preferred examples of the invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A method for crosslinking a polymer, the method comprising, blending (A) a polymer selected from the group consisting of polyvinyl chloride, copolymer of vinyl chloride, chlorinated polyethylene, chlorinated polyvinyl chloride, and polyvinylidene chloride; and (B) a metal or organometal salt of polyvalent organic acid or inorganic acid; said polyvalent organic acid being selected from the group consisting of aliphatic and aromatic polyvalent compounds having a plurality of functional groups selected from the group consisting of carboxyl, mercapto and phenolic hydroxyl radicals; said inorganic acid selected from the group consisting of carbonic acid, hydrogen sulfide, boric acid and silicic acid; said metal being selected from the group consisting of sodium, potassium, lithium, calcium, magnesium, barium, beryllium, zinc, copper, cadmium, and strontium; and said organometal being organotin; said blending being effected in the presence of a hydrocarbyl saturated onium salt, said onium being a cation of the group consisting of ammonium, phosphonium, sulfonium, selenonium, arsonium, stibonium and telluronium.

2. The method as set forth in claim 1 wherein said polyvalent organic acid is a member of the group consisting of oxalic acid, malonic acid, succinic acid, glutaric acid, adipic acid, pimelic acid, suberic acid, azelaic acid, sebacic acid, maleic acid, fumaric acid, citraconic acid, mesaconic acid, itaconic acid, glutaconic acid, tartronic acid, malic acid, tartaric acid, citric acid, phthalic acid, isophthalic acid and terephthalic acid.

3. The method as set forth in claim 1 wherein said polyvalent organic acid is a dimercaptane of the group consisting of ethanedithiol, butanedithiol, dithioglycerol, dimercaptoacetone, dithiocatechol, dithioresorcinol and dithioquinol.

4. The method as set forth in claim 1 wherein said polyvalent organic acid is a dihydric phenol compound of the group consisting of hydroquinone, catechol, resorcinol and bisphenol-A.

5. The method as set forth in claim 1 wherein said polyvalent organic acid is a dibasic compound of the group consisting of thioglycolic acid and p-hydroxybenzoic acid.

6. The method as set forth in claim 1 in which said hydrocarbyl saturated onium salt is an acid addition salt, wherein said acid is selected from the group consisting of hydrochloric acid, hydrobromic acid, hydroiodic acid, nitric acid, nitrous acid, sulfuric acid, sulfurous acid, alkylsulfuric acid, phosphoric acid, carboxylic acid, mercaptane compound and phenolic compound.

7. The method as set forth in claim 1 wherein blending is effected at a temperature in the range of from 60° C. to 170° C.

8. A method for crosslinking a polymer, the method comprising, (A) blending a polymer selected from the group consisting of polyvinyl chloride, copolymer of vinyl chloride, chlorinated polyethylene, chlorinated polyvinyl chloride, and polyvinylidene chloride; and (B) a metal or organometal salt of a polyvalent inorganic weak acid; said acid selected from the group consisting of carbonic acid, hydrogen sulfide, boric acid and silicic acid; said metal being selected from the group consisting of sodium, potassium, lithium, calcium, magnesium, barium, beryllium, zinc, copper, cadmium, and strontium; and said organometal being organotin; said blending being effected in the presence of a catalytic amount of a hydrocarbyl saturated onium salt, said onium being a cation of the group consisting of ammonium, phosphonium, sulfonium, selenonium, arsonium, stibonium and telluronium.

9. The method as set forth in claim 8 in which said hydrocarbyl saturated onium salt is an inorganic or organic acid addition salt, wherein said acid is selected from the group consisting of hydrochloric acid, hydrobromic acid, hydroiodic acid, nitric acid, nitrous acid, sulfuric acid, sulfurous acid, alkyl sulfuric acid, phosphoric acid, carboxylic acid, mercaptane compound and phenolic compound.

10. The method as set forth in claim 8 wherein blending is effected at a temperature in the range from 60° C. to 170° C.

11. The method as set forth in claim 8 in which the catalytic amount is from 0.1 to 1% by weight based on the weight of the polymer.

12. A method for crosslinking a polymer, the method comprising, blending a polymer selected from the group consisting of polyvinyl chloride, copolymer of vinyl chloride, chlorinated polyethylene, chlorinated polyvinyl chloride, and polyvinylidene chloride in the presence of a hydrocarbyl saturated onium salt of a polyvalent carboxylic acid, said onium being a cation of the group consisting of ammonium, phosphonium, sulfonium, selenonium, arsonium, stibonium and telluronium.

13. The method as set forth in claim 12 wherein the polyvalent carboxylic acid is selected from the group consisting of oxalic acid, malonic acid, succinic acid, glutaric acid, adipic acid, pimelic acid, suberic acid, azelaic acid, sebacic acid, maleic acid, fumaric acid, citraconic acid, mesaconic acid, itaconic acid, glutaconic acid, tartronic acid, malic acid, tartaric acid, citric acid, phthalic acid, isophthalic acid, terephthalic acid, polyoxypropylene disuccinate and polyoxypropylene diadipate.

14. The method as set forth in claim 12 wherein blending is effected at a temperature in the range from 60° C. to 170° C.

15. A method for crosslinking a polymer, the method comprising, blending a polymer selected from the group consisting of polyvinyl chloride, copolymer of vinyl chloride, chlorinated polyethylene, chlorinated polyvinyl chloride, and polyvinylidene chloride in the presence of a hydrocarbyl saturated onium salt of a polyvalent inorganic weak acid, said onium being a cation of the group consisting of ammonium, phosphonium, sulfonium, selenonium, arsonium, stibonium and telluronium, said acid selected from the group consisting of carbonic acid, hydrogen sulfide, boric acid and silicic acid.

16. The method as set forth in claim 15 wherein blending is effected at a temperature in the range from 60° C. to 170° C.

17. The method as set forth in claim 1 wherein said polyvalent organic acid is a long chain-type polyvalent compound selected from the group consisting of polyoxypropylene diadipate, polyoxypropylene disuccinate, carboxyl terminated polyester and a polymer produced by chemical reaction between dichlorodiethylformal and alkali polysulfide.

References Cited

UNITED STATES PATENTS

| | | | |
|---|---|---|---|
| 3,117,113 | 1/1964 | Tudor | 260—92.8 |
| 3,379,707 | 4/1968 | Lund | 260—94.9 |
| 3,696,084 | 10/1972 | Gordon | 260—79.3 R |

JOSEPH L. SCHOFER, Primary Examiner

A. HOLLER, Assistant Examiner

U.S. Cl. X.R.

260—78.4 D, 87.5 R, 91.5, 92.3, 92.8 AC, 92.8 R, 94.9 GA, 94.9 H